United States Patent
Lloyd et al.

(10) Patent No.: US 7,534,152 B1
(45) Date of Patent: May 19, 2009

(54) UNDERWATER FLOAT RELEASE SYSTEM

(75) Inventors: Cory Lloyd, 7691 Hertiage Blvd., Hobe Sound, FL (US) 33455; Shawn Kallivayalil, 1100 SW. 12th St., #310, Fort Lauderdale, FL (US) 33315

(73) Assignees: Cory Lloyd, Hobe Sound, FL (US); Shawn Kallivayalil, San Francisco, CA (US)

( * ) Notice: Subject to any disclaimer, the term of this patent is extended or adjusted under 35 U.S.C. 154(b) by 0 days.

(21) Appl. No.: 11/686,730

(22) Filed: Mar. 15, 2007

Related U.S. Application Data

(60) Provisional application No. 60/767,282, filed on Mar. 15, 2006.

(51) Int. Cl.
*B63B 22/06* (2006.01)

(52) U.S. Cl. ................................. 441/2; 441/21; 441/25

(58) Field of Classification Search ......... 114/326–329; 441/2, 6, 21, 23–27
See application file for complete search history.

(56) References Cited

U.S. PATENT DOCUMENTS

| | | | | |
|---|---|---|---|---|
| 3,858,166 | A | * | 12/1974 | Hammond .................. 367/133 |
| 4,262,379 | A | * | 4/1981 | Jankiewicz .................... 441/2 |
| 4,664,559 | A | * | 5/1987 | Berrang ....................... 405/224 |
| 5,100,353 | A | * | 3/1992 | Domborwski et al. .......... 441/6 |
| 6,739,924 | B1 | | 5/2004 | Goren et al. |

\* cited by examiner

*Primary Examiner*—Lars A Olson
(74) *Attorney, Agent, or Firm*—Clark A. D. Wilson; Gardner Groff Greenwald & Villanueva, P.C.

(57) ABSTRACT

An underwater buoy release system having a moment arm release system. The moment arm release system has a magnetically attractive arm structure connected to a buoy. The buoy release system further includes an electromechanical device having magnetically attractive elements, wherein the electromechanical device moves the magnetically attractive elements toward, and away from, the magnetically attractive arm structure. The magnetic attraction in the moment arm release system and the electromechanical device is created by rare earth magnets. The buoy release system further includes a signal reception device, wherein the signal reception device includes a battery, a signal reception transducer, and a PC board. The PC board is formatted to decipher a predetermined signal transmitted from a remote signal transmission device.

10 Claims, 5 Drawing Sheets

UNDERWATER FLOAT RELEASE SYSTEM

BACKGROUND OF THE INVENTION

1. Field of the Invention

The present invention generally relates to a remote operated underwater float release system. More specifically, it relates to a remote operated underwater float release system that will aid in the location of devices which have been left underwater.

2. Description of Related Art

Floats and buoys are common in the marine related industry. They help users locate devices which have been left submerged beneath the water's surface. For example, floats are used to locate lobster and crab pots, devices related to oil rigs, and military uses. These floats are commonly attached to the device by a lengthy rope. The floats then rest on the surface for ease of location. Thus, a long piece of rope is left exposed in the water. This rope can become tangled or broken. Also, theft has long been a major problem, especially in the lobster industry. It is very easy to find and steal a lobster trap if the float is resting on the surface of the water.

Attempts to correct this problem have arisen. For example U.S. Pat. No. 6,739,924 issued to Groen et al. on May 25, 2004 entitled "remotely Activated Buoy" teaches a device that retains a buoyant reel on a lobster trap and uses a remote operated transmitter to send a pulse to a receiver connected to an actuator on the lobster trap. The actuator releases the buoyant reel, which spins upwardly away from the lobster trap. The manner in which the buoyant reel rises to the surface, however, often leads to twisting of the rope and the potential for getting tangled on another object. A her problem with the Groen design is that all parts are exposed. This leaves the parts susceptible to rust and growth, which cause the device to not operate or operate improperly.

A further problem with the current attempted solutions is the potential that the remote operated transmission and receiver will not operate properly, thus keeping the lobster trap or other device at the ocean floor. An attempt to solve this problem uses a corrodible wire or line that is attached to the buoyant reel. The salinity in the water slowly eats away at the wire until the buoyant reel's buoyant force breaks the wire and rises to the surface, so the user may locate the lobster trap at a later date. This corrosion is not guaranteed and is dependent upon numerous variables to properly corrode the wire in a fashion that will eventually break the wire. The length of time required to corrode the wire may be estimated, but is never completely certain.

U.S. Pat. No. 5,100,353 issued to Dombrowski et al. on Mar. 31, 1992 entitled "Electromagnetic Marker Float Release" teaches the use of electromagnets in conjunction with a signal transmitted and receiver to operate a buoy release. Electromagnets require a consistent source of power, thus limiting their length of usage time. An alternative form of magnetic energy would be preferred in order to allow for the buoy release system to be left in the water longer.

Thus, it is desired that a device utilize an attractive force which is kept within a watertight enclosure and does not require a consistent source of energy. It is further desired that an automatic release device is maintained which is not affected by elements.

SUMMARY OF THE INVENTION

The present invention satisfies the above stated needs. This invention is a system that secures a buoyant floating object to an underwater apparatus and keeps it underwater until the buoyant floating object is released by the transmission from a remote signal above the surface of the water. The system is operated through magnetic forces and signal transmission. Once released, the buoyant floating object, which is attached to the underwater apparatus through a line, floats to the surface. At this point, a user may locate the floating object and retrieve the underwater apparatus. The system has a backup mechanism that releases the floating object automatically after a certain period of time, if the transmission unit is not effective.

DETAILED DESCRIPTION

Figure 1:
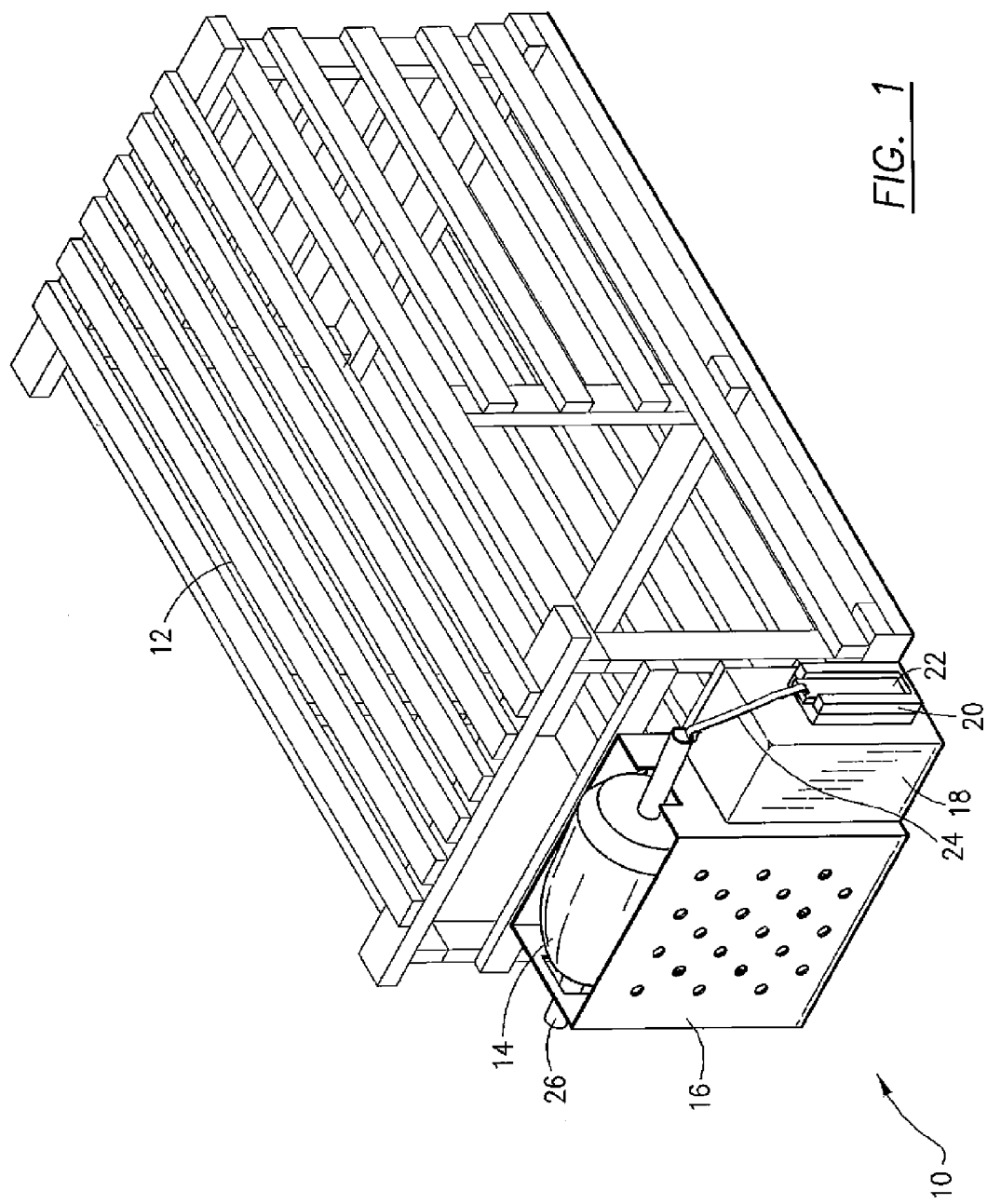
FIG. 1 is a perspective view of the underwater buoy release system attached to a lobster trap.

With reference to FIG. 1, a perspective view of the underwater buoy release system 10 is shown as it would be attached to a holding fixture 16 and a submersible object 12. The system 10 is comprised of several pieces. A buoy hold fixture 16 may be secured to an submersible object 12. This hold fixture 16 may have a particular shape and size that will allow for the insertion of a significant length of line attached to a buoy 14. The majority of the buoy's 14 buoyant force is absorbed by the design of the hold fixture 16. The hold fixture 16 will most likely have a closed bottom, closed sidewalls, and an open top. The line will be inserted into the hold fixture 16 and the buoy 14 is secured across the open top of the hold fixture 16 acting as a barrier against the unwanted exit of any line. The buoy 14 is inserted through one side wall of the holding fixture 16 to use physical force to keep it in place. The other side of the buoy 14 will rest in an open cut-out on an opposite top edge of the holding fixture 16 and will be kept in place by the moment arm release system described below. The line will be freely inserted and no reel or knots will restrict the free release of the line. The hold fixture 16 may be constructed of a variety of materials, however, it is contemplated that plastic will be most likely. The holding fixture 16 will likely be painted with anti-fouling paint that is non-metallic based. This paint will prevent the growth of unwanted life or rust that would hinder the operation of the system 10.

A housing unit 18 will be located on the side of the hold fixture 16. The housing unit 18 is a water-tight solid structural casing. This water-tight casing will most likely be constructed of plastic, but it is contemplated that alternative materials may be used. A magnetically attracted object is embedded in an arm structure 22 that is located outside of the water-tight casing 20. The arm structure 22 is attached to the buoy 14 through connectivity means 24 and is used to secure the buoy to the holding fixture. A rigid rod 26 is contemplated to run through the buoy 14 and aid in securing the buoy 14 to the holding fixture 16. Such connectivity means 24 may be a cord, rope, wire, or any capable means of connection. A coupling structure 20 is mounted permanently to the outside of the water-tight housing 18. This coupling structure 20 is contemplated to be a groove and ledge. The arm structure 22 has a matching shape to the groove and ledge and secures into it physically. The coupling structure 20 may have an upper ledge which provides physical resistance against the upward buoyant force of the buoy 14. The upper ledge prevents the arm structure 22 from being pulled upwardly by the buoy 14.

Figure 2:
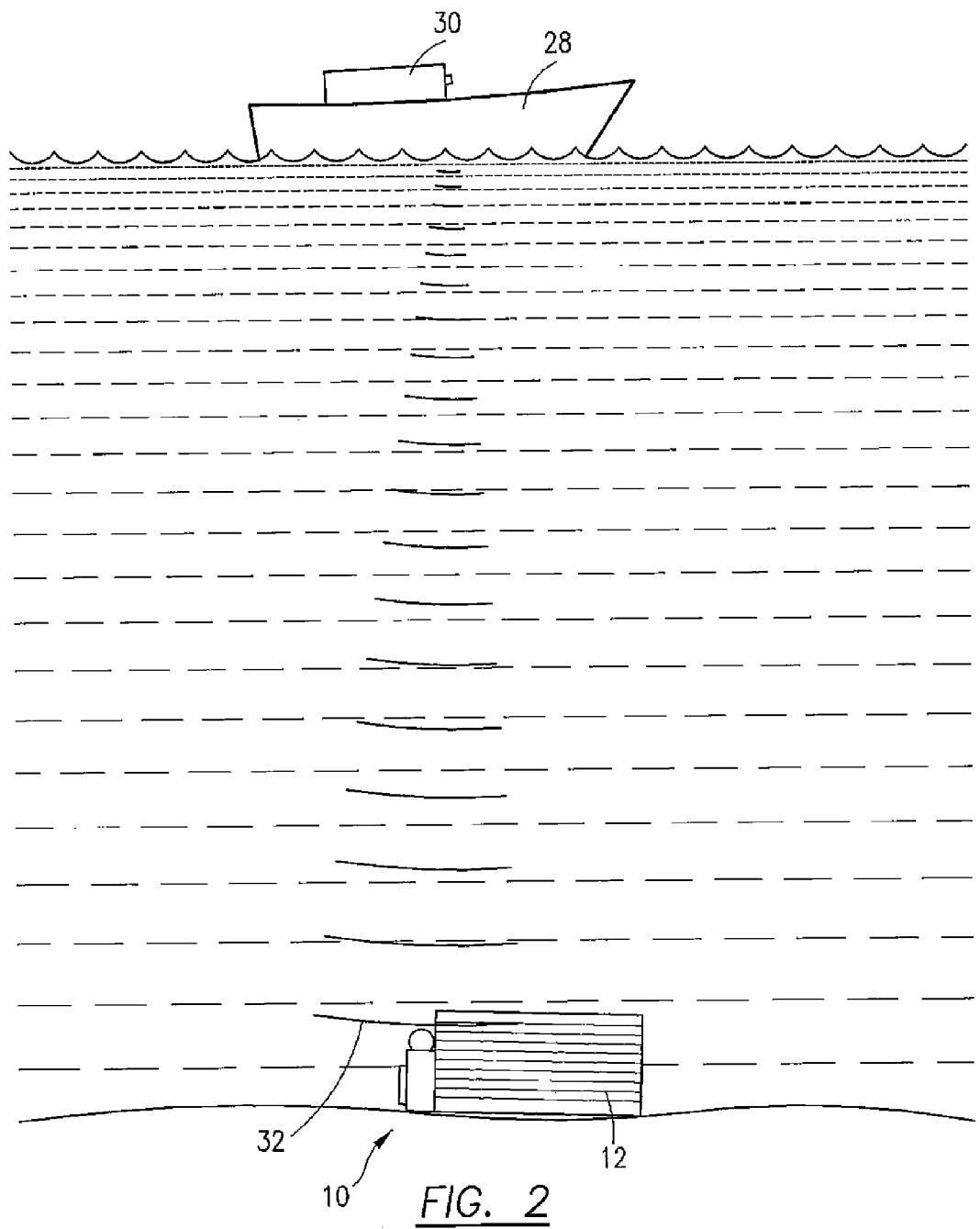
FIG. 2 is a representation of a remote signal transmission unit transmitting a signal to the underwater buoy release system.

With reference to FIG. 2, a remote signal transmission unit 30 is shown as being located at the surface of the water. Any signal transmission device which is capable of transmitting a specific signal will work. Most likely, this unit will be held in the hand of a user or secured to the underside of a boat 28. This transmission unit 30 is inserted just beneath the surface of the water and is programmed to send out a particular encoded electronic signal 32. This encoded electronic signal 32 may be created by an 8-piece Dip switch, however it is contemplated that alternative encoding means are available. This encoded signal 32 will be unique to each system preventing unauthorized use. For example, if an 8 piece dip switch is used to encode the signal, the dip switch allows a user to choose from 256 possible different signals. Most likely, the type of transmission sent will be ultrasound, however it is contemplated that other methods may be used such as sonar, acoustic, radio frequencies, or digitally encoded signals. The signal 32 is received by the underwater buoy release system 10, which is attached to a submersible object 12. The signal transmission unit 30 may be powered through a portable battery or through a boat's battery.

Figure 3:
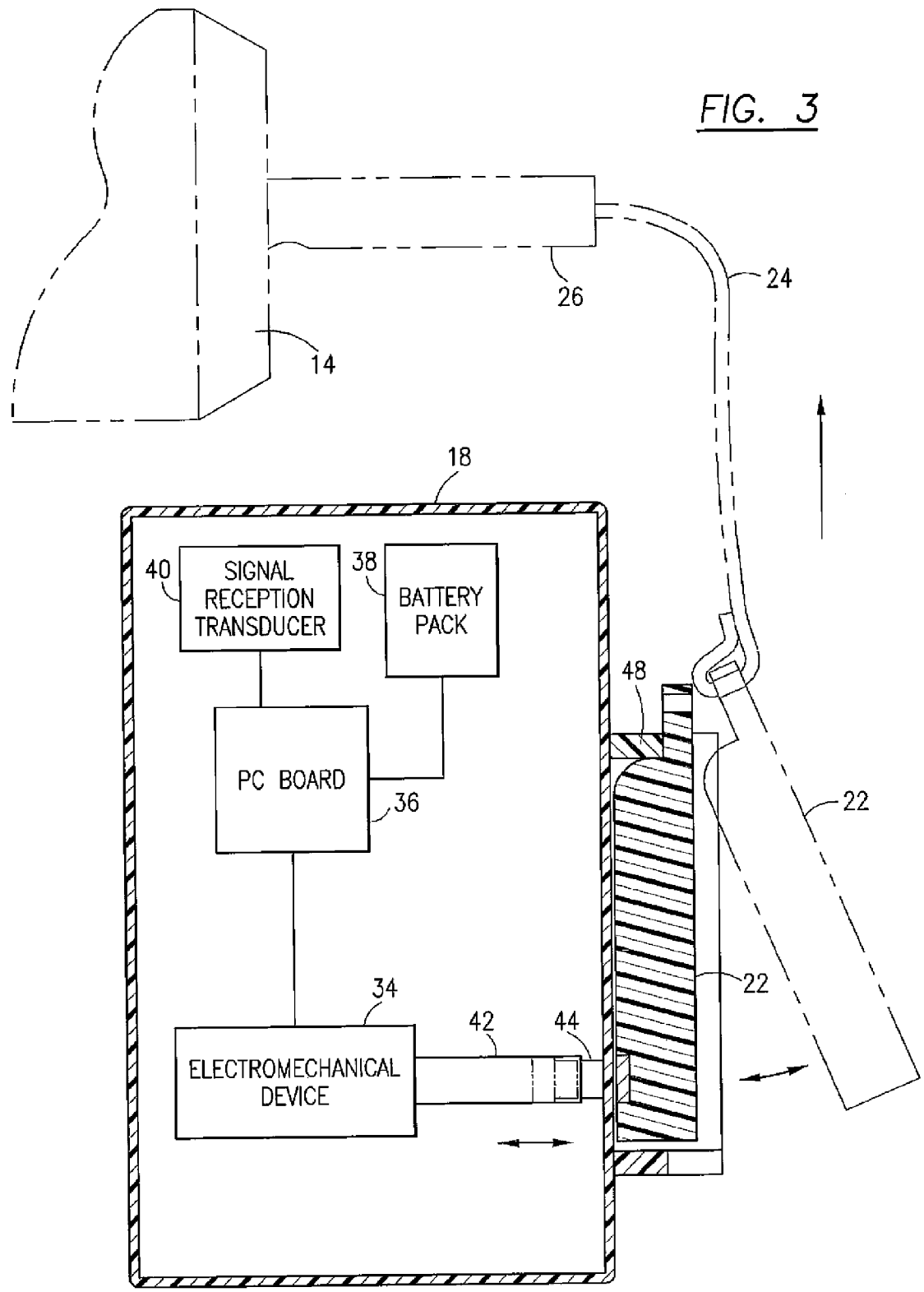
FIG. 3 is a cross section of the buoy release system showing the action of the arm release structure.

With reference to FIG. 3, a cross section of the buoy release system 10 is shown. The signal reception unit will consist of a battery 38, a signal reception transducer 40, and a PC board 36 that is formatted and programmed to receive and read the particular signal transmitted by the transmission unit 30 shown in FIG. 2. The battery 38, signal reception transducer 40, and PC Board 36 will be connected through wiring. The signal reception unit will be housed in the housing 18. The signal reception unit will likely be painted with anti-fouling paint that is non-metallic based. This paint will prevent the growth of unwanted life or rust that would hinder the operation of the system.

An electromechanical device 34 is contained within the water-tight housing 18. The electromechanical device 34 has a pin 42 which moves outwardly from, and retracts into, the electromechanical device 34. The action of the electromechanical device 34 may be produced by an actuator or a DC Motor or a gear structure. The pin 42 has magnets 44 at the end. The magnets 44 are contemplated to be rare earth magnets and thus require no power to create magnetic attraction. When the signal reception unit receives a signal, the electromechanical device 34 retracts the pin 42 and magnet 44 away from the inner wall of the water-tight casing 18.

An arm release system is located on the exterior surface of the housing 18. The arm structure 22 is connected to the buoy 26 through the connection means 24. The arm structure 22 is contemplated to be a solid structure, most likely made of a synthetic material such as plastic. It is contemplated that the top surface will incorporate a chamfered edge. The arm structure 22 will further have a magnet 46 within it at a location near the bottom. The magnet 46 is a rare earth magnet. The polarity of the magnet 46 and the magnet 44 on the pin will be opposite and thus will attract to each other.

The arm release system further comprises a coupling structure 48 permanently mounted to the exterior surface of the housing 18. The coupling structure 48 is comprised of solid walls organized in a rectangular shape. The coupling structure 48 has an open face which faces away from the housing structure 18. The size and shape of the open face is sufficient to accept insertion of the arm structure 22 with the chamfered top edge facing the top wall. Thus, the top wall of the coupling structure 48 provides downward resistance against the top chamfered edge of the arm structure 22.

The magnet 46 in the arm structure 22 is placed such that it aligns with the magnet 44 influenced by the electromechanical device 34. When the arm structure 22 is inserted into the coupling structure 48, the pin 42 of the electromechanical device 34 is locked in an extended position, such that the magnet 44 is extended toward the interior surface of the housing structure 18. The magnetic attraction between the magnets 44, 46 aids in keeping the arm structure 22 inside of the coupling structure.

When the signal reception transducer 40 receives the signal 32 and the PC Board 36 reads the signal 32 sent from the remote signal transmission unit 30, the electromechanical device 34 retracts the pin 42 and magnet 44 away from the interior surface of the housing 18. As shown in FIG. 3, when the pin 42 is retracted by the electromechanical device 34, the magnetic attraction between the magnets 44, 46 is reduced or removed. The arm structure 22 resultantly pops out of the coupling structure 48 and the chamfered top edge allows the arm structure to freely exit the coupling structure 48. Once the arm structure 22 exits the coupling structure 48, the downward force is no longer sufficient to oppose the upward buoyant force of the buoy 14. Therefore, the buoy 14 floats upwardly toward the surface of the water.

Figure 4:
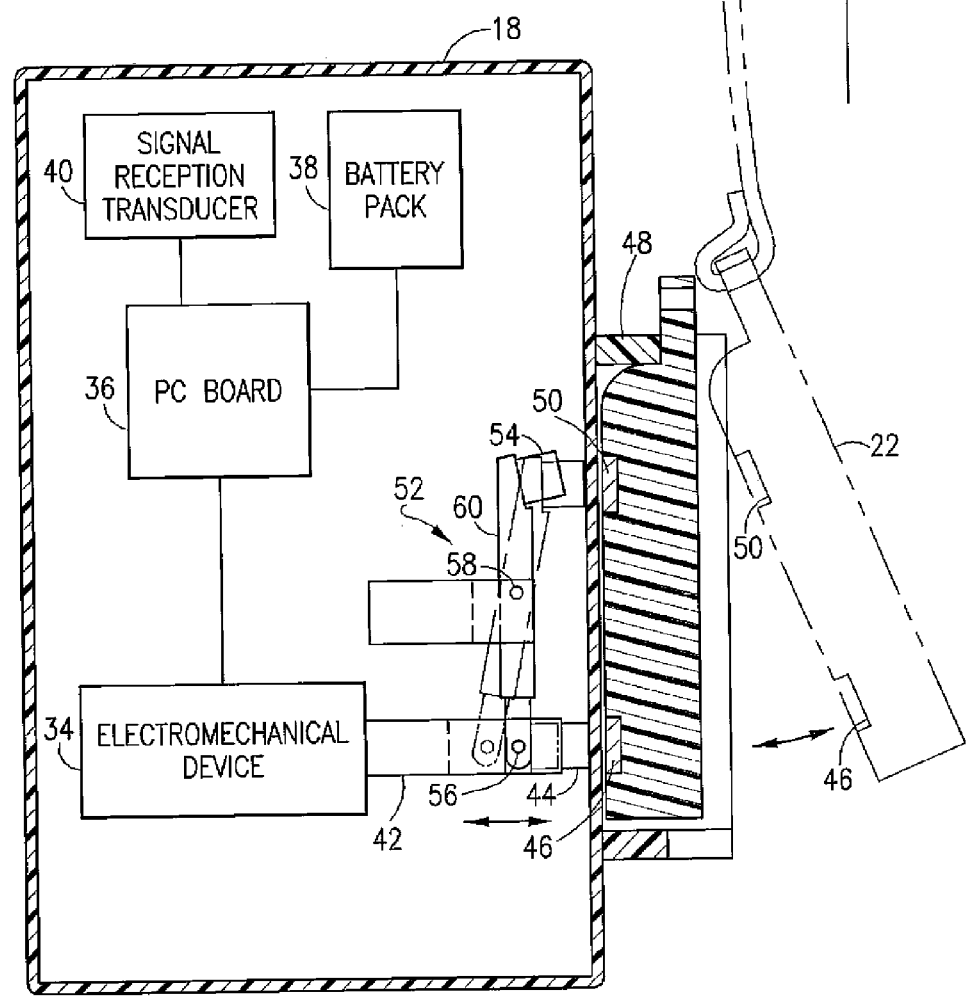
FIG. 4 is a cross section of the buoy release system showing the action of the arm release structure and the additional seesaw structure.

With reference to FIG. 4 a cross section of the buoy release system 10 is shown with the action of the arm release structure and the additional seesaw structure 52. The seesaw structure 52 is an additional mechanism which provides for a cleaner separation of the arm structure 22 from the coupling structure 48. As shown, the seesaw structure 52 has a pivotal connection 56 to the pin 42 which extends and retracts from the electromechanical device 34. There is an elongated arm 60 extending upward from the pivotal connection 56. The top of the elongated arm 60 will have a magnet 54. The elongated arm 60 will pivot back and forth on a central pivot point 58. As shown in the FIG. 4, when the pin 42 in the electromechanical device 34 is locked in the forward position, the magnet 54 on the seesaw structure 52 is pushed away from the interior surface of the housing 18. When the PC Board 36 tells the electromechanical device 34 to retract the pin 42 and magnet 44, the magnet 54 on the seesaw structure 52 is angled toward the interior surface of the housing 18.

As further shown, the arm structure 22 may additionally have a second magnet 50 near the top of the arm structure 22. The magnet 54 on the seesaw structure 52 has the same polarity as the second magnet 50 on the arm structure 22. Thus these two magnets repel each other. When the magnet 44 in the pin is pulled away from the magnet 46 at the bottom of the arm structure 22, a magnetic attraction is broken. When the magnet 54 on the seesaw structure 52 is pushed toward the interior surface of the housing unit 18, the magnetic repulsion created between magnets 54, 50 forces the arm structure 22 out of the coupling structure 48.

Figure 5:
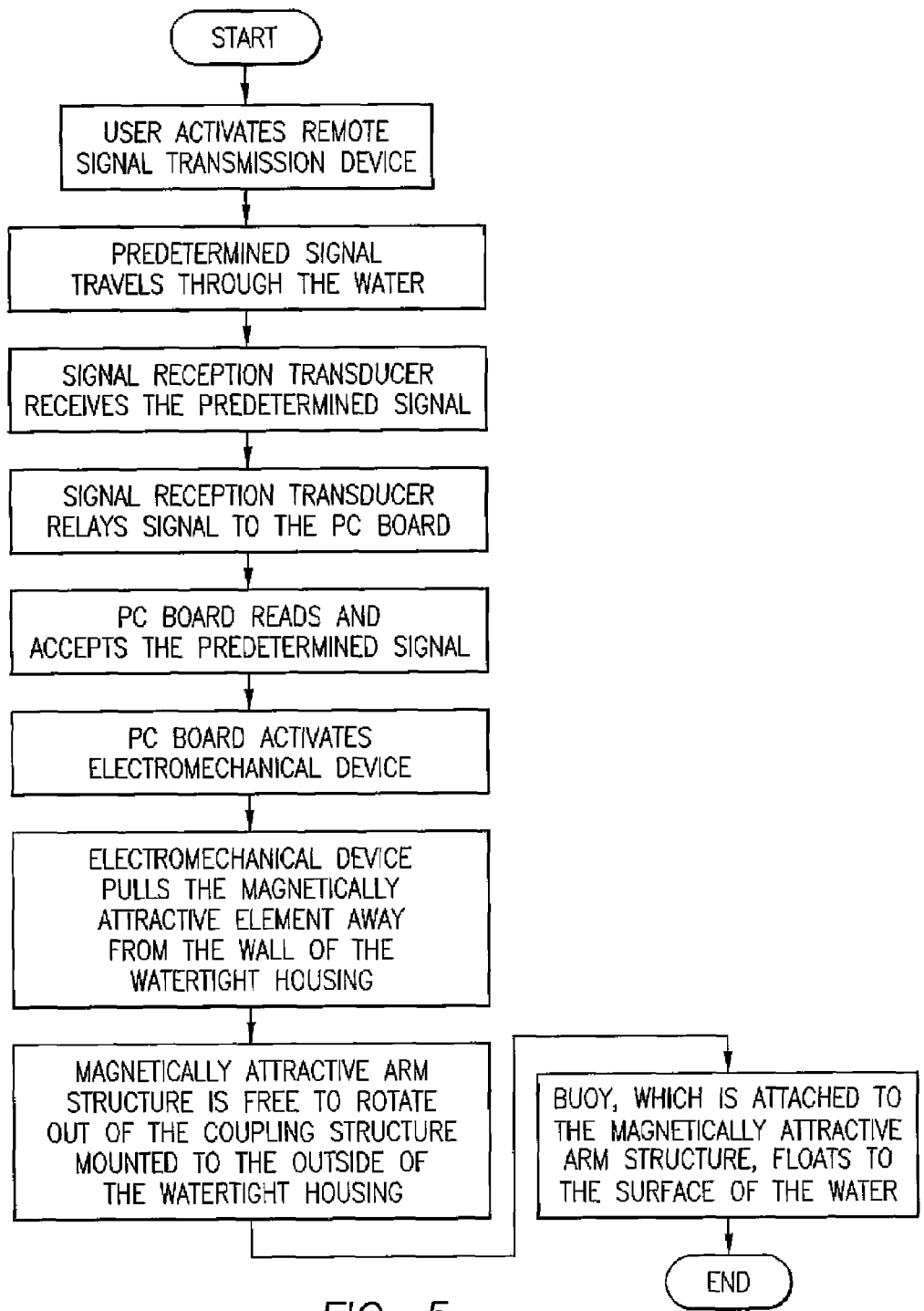
FIG. 5 is a flow chart of the operation of the buoy release system.

With reference to FIG. 5, a flow chart of the operation of the underwater buoy release system 10 is provided. The underwater apparatus 12, as shown in FIG. 2, is located under the surface of the water. When the user desires to locate the underwater apparatus 12, he/she places the remote signal transmitter 30 beneath the surface of the water and initiates the signal transmission. The particular transmitter is programmed to release a signal 32 which can be read only by the signal reception transducer 40, as shown in FIG. 3, in the water-tight container/housing 18. The signal reception transducer 40 sends the signal to the PC board 36, which is capable of deciphering the particular signal 32. The PC board 36 then activates the electromechanical device 34. When activated, the electromechanical device 34 pulls the pin 42 and magnet 44 away from the inside wall of the housing 18 and the arm structure magnet 46 through the use of an actuator, a Direct Current motor or a gear box, however, it is contemplated that alternate means of separation may be used. This action breaks the magnetic field. When his occurs, the force created by the buoyancy of the buoy 14 becomes too great for the magnetic force and the resistant force created by the ledge and groove in the coupling structure 48 on the outer surface of the watertight housing 18. This causes the arm structure 22 to completely release from the groove, and release the buoy 14 from the hold fixture 16. The buoy 14 then rises to the surface with the line attached to it.

A further automatic release mechanism is contemplated to be formatted within the PC board in the water-tight housing 18. This automatic release system contains an internal, software based clock that is set for a specific length of time. If a user has not released the buoy 14 through signal transmission by the designated time in the automatic release system, the clock activates the magnetic moment arm release system. This act releases the buoy 14 to the surface, so that the user may find the submersible 12.

What is claimed is:

1. A buoy release system, said buoy release system comprising:
   a watertight housing;
   an arm structure connected to a buoy through connection means, said arm structure being removably secured to the exterior surface of said watertight housing;
   an electromechanical device, said electromechanical device being secured within the interior of said watertight housing;
   said electromechanical device selectively controlling the release of said arm structure;
   a signal reception device, said signal reception device being secured within the interior of said housing;
   a seesaw mechanism;
   said signal reception device further including a battery, a signal reception transducer, and electronic components;
   said signal reception device being formatted to receive and read a predetermined signal transmitted from a remote signal transmission device;
   said electromechanical device releasing said arm structure when said signal reception device receives a remote signal transmission;
   said arm structure further comprising a first magnet and a second magnet and said electromechanical device further comprising a magnet;
   said arm structure first magnet and said electromechanical device magnet having opposite polarity;
   said seesaw mechanism having a magnet of repellant polarity to said arm structure second magnet; and
   said seesaw mechanism being pivotally attached to said electromechanical device.

2. The buoy release system described in claim 1, further comprising a software mandated automatic release mechanism that triggers said electromechanical device to release said arm structure when a predetermined length of time has expired.

3. The buoy release system described in claim 1, further comprising a coupling structure;
   said coupling structure releasably securing said arm structure.

4. The buoy release system described in claim 1, wherein said electromechanical device is an actuator.

5. The buoy release system described in claim 1, wherein said electromechanical device is a direct current motor.

6. A buoy release system, said buoy release system comprising:
   a watertight housing;
   an arm structure connected to a buoy through connection means, said arm structure being removably secured to the exterior surface of said watertight housing;
   a first and second magnets located in said arm structure;
   a coupling structure;
   said coupling structure releasably securing said arm structure;
   an electromechanical device, said electromechanical device being secured within the interior of said watertight housing;
   said electromechanical device selectively controlling the release of said arm structure;
   a magnet secured to said electromechanical device;
   said electromechanical device magnet having opposite polarity to said arm structure first magnet;
   a signal reception device, said signal reception device being secured within the interior of said housing;
   said signal reception device further including a battery, a signal reception transducer, and electronic components;
   said signal reception device being formatted to receive and read a predetermined signal transmitted from a remote signal transmission device;
   said electromechanical device releasing said arm structure when said signal reception device receives a remote signal transmission;
   a seesaw mechanism;
   said seesaw mechanism having a magnet of repellant polarity to said arm structure second magnet;
   said seesaw mechanism being pivotally attached to said electromechanical device.

7. The buoy release system described in claim 6, further comprising a software mandated automatic release mechanism that triggers said electromechanical device to release said arm structure when a predetermined length of time has expired.

8. The buoy release system described in claim 6, wherein said electromechanical device is an actuator.

9. The buoy release system described in claim 6, wherein said electromechanical device is a direct current motor.

10. A buoy release system, said buoy release system comprising:
    means for providing a watertight housing;
    means for releasing said buoy, said means for releasing being removably secured to said means for providing a watertight housing;
    means for selectively controlling said means for releasing;
    means for receiving signals from a remote source, said means for receiving being in electronic communication with said means for selectively controlling, wherein said means for receiving signals comprises a means for reading a signal transmitted from a remote source and a means for deciphering the signal transmitted from a remote source;
    said means for providing a watertight housing accommodating said means for selectively controlling and said means for receiving signals; and
    upon reception, reading and deciphering of a predetermined signal, said means for deciphering signals enables the release of said buoy.

* * * * *